(12) United States Patent
Deocampo et al.

(10) Patent No.: US 12,018,766 B2
(45) Date of Patent: Jun. 25, 2024

(54) MODULAR LINEAR ACTUATED VALVE

(71) Applicant: FALCONVIEW ENERGY PRODUCTS LLC, Houston, TX (US)

(72) Inventors: Hernani G. Deocampo, Houston, TX (US); Dean Madell, Alberta (CA)

(73) Assignee: FALCONVIEW ENERGY PRODUCTS LLC, Houston, TX (US)

( * ) Notice: Subject to any disclaimer, the term of this patent is extended or adjusted under 35 U.S.C. 154(b) by 26 days.

(21) Appl. No.: 18/166,058

(22) Filed: Feb. 8, 2023

(65) Prior Publication Data
US 2023/0258269 A1    Aug. 17, 2023

Related U.S. Application Data

(60) Provisional application No. 63/309,343, filed on Feb. 11, 2022.

(51) Int. Cl.
| | |
|---|---|
| F16K 27/04 | (2006.01) |
| F16K 3/02 | (2006.01) |
| F16K 31/12 | (2006.01) |
| F16K 31/44 | (2006.01) |

(52) U.S. Cl.
CPC .......... *F16K 3/0272* (2013.01); *F16K 3/0254* (2013.01); *F16K 27/044* (2013.01); *F16K 31/12* (2013.01); *F16K 31/44* (2013.01)

(58) Field of Classification Search
CPC .... F16K 3/0272; F16K 3/0254; F16K 27/044; F16K 31/12; F16K 31/44; F16K 3/314
See application file for complete search history.

(56) References Cited

U.S. PATENT DOCUMENTS

| 2014/0174554 A1* | 6/2014 | Meyberg | F16K 1/48 |
| | | | 137/315.27 |
| 2017/0089485 A1* | 3/2017 | Gelbmann | F16K 31/1221 |
| 2021/0033211 A1* | 2/2021 | Choate | F16K 3/0272 |

FOREIGN PATENT DOCUMENTS

| DE | 102008010765 A1 * | 8/2009 | ............... F16K 1/48 |
| WO | WO-2021021466 A1 * | 2/2021 | ........... F16K 27/044 |

* cited by examiner

*Primary Examiner* — Marina A Tietjen
(74) *Attorney, Agent, or Firm* — Jackson Walker LLP

(57) ABSTRACT

The present disclosure provides a modular linear actuated valve having a lower body module that can interface with an interchangeable upper linear actuator module being at least one of a mechanical linear actuator module and a fluid linear actuator module. The invention includes a quick disconnect between the body module and any of the actuator modules. An actuator assembly on the selected actuator module can be coupled to the valve stem on the lower body module using a quick disconnect segment on the actuator module and a reciprocal quick disconnect segment on the body module. A valve can be quickly converted into a mechanical linear actuated valve or a fluid linear actuator valve, simplifying manufacturing and stocking, and providing a faster response to customer orders.

7 Claims, 11 Drawing Sheets

MODULAR LINEAR ACTUATED VALVE

CROSS REFERENCE TO RELATED APPLICATIONS

The application claims the benefit of U.S. Provisional Application Ser. No. 63/309,343, entitled "Modular Linear Actuated Valve", filed Feb. 11, 2022, which is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to a valve with modular actuators. More specifically, the disclosure relates linear actuated valves with modular linear actuators that are interchangeable.

Description of the Related Art

Linear actuated valves are ubiquitous to society. Linear actuated valves include, for example, gate valves, globe valves, plug valves, and others. Gate valves are particularly used in oil field, industrial, agricultural sectors for controlling flow. For oil field applications, gate valves can be designed for high pressure applications, such as about 15,000 psi. Actuators are used to open and close the valves. Mechanical linear actuators are frequently provided with a hand wheel attached to a threaded stem of the valve that is attached to a sealing disk known as a "gate" that is internal to the valve body. The mechanical linear actuator can raise and lower the gate by rotating a hand wheel. The hand wheel can rotate a threaded valve stem actuator in a corresponding thread within the valve body causing through a mechanical advantage the sealing disk to move between open and closed positions.

In some applications, a hydraulic or pneumatic actuator as a linear actuator can be used instead of a mechanical linear actuator. A hydraulic actuator can be attached to the valve, but the valve has historically required a different valve body and stem to function with the hydraulic actuator than the mechanical linear actuator requires.

A typical manufacturer is required to manufacture and stock at least two types of valves for mechanical and hydraulic or pneumatic actuation, each type having the various sizes, pressure ratings, and service classes for customers.

Therefore, there remains a need for an improved linear actuated valve.

BRIEF SUMMARY OF THE INVENTION

The present disclosure provides a modular linear actuated valve having a lower body module that can interface with an interchangeable upper linear actuator module being at least one of a mechanical linear actuator module and a fluid linear actuator module. The invention includes a quick disconnect between the body module and any of the actuator modules. An actuator assembly on the selected actuator module can be coupled to the valve stem on the lower body module using a quick disconnect segment on the actuator module and a reciprocal quick disconnect segment on the body module. A valve can be quickly converted into a mechanical linear actuated valve or a fluid linear actuator valve, simplifying manufacturing and stocking, and providing a faster response to customer orders.

The disclosure provides a modular linear actuated valve, comprising: a body module comprising: a valve body with at least one body bore formed in the body to allow fluid to flow therethrough; a sealing element configured to selectively seal across the body bore; a valve stem coupled to the sealing element, the valve stem configured to move linearly in a direction to open and close the sealing element across the body bore; and a first quick disconnect segment coupled on a portion of the valve stem distal from the sealing element. The modular linear actuated valve also comprises a linear actuator module configured to be coupled to the body module, comprising: a linear actuator configured to move linearly relative to the valve stem in the body module; and a second quick disconnect segment coupled to the linear actuator and configured to be coupled to the first quick disconnect segment. The modular linear actuated valve further comprises a removable coupling element configured to removably couple the body module with the linear actuator module.

BRIEF DESCRIPTION OF THE SEVERAL VIEWS OF THE DRAWINGS

FIG. 6C is a schematic perspective view of the upper quick disconnect segment of FIG. 6A.

DETAILED DESCRIPTION

Figure 1A:
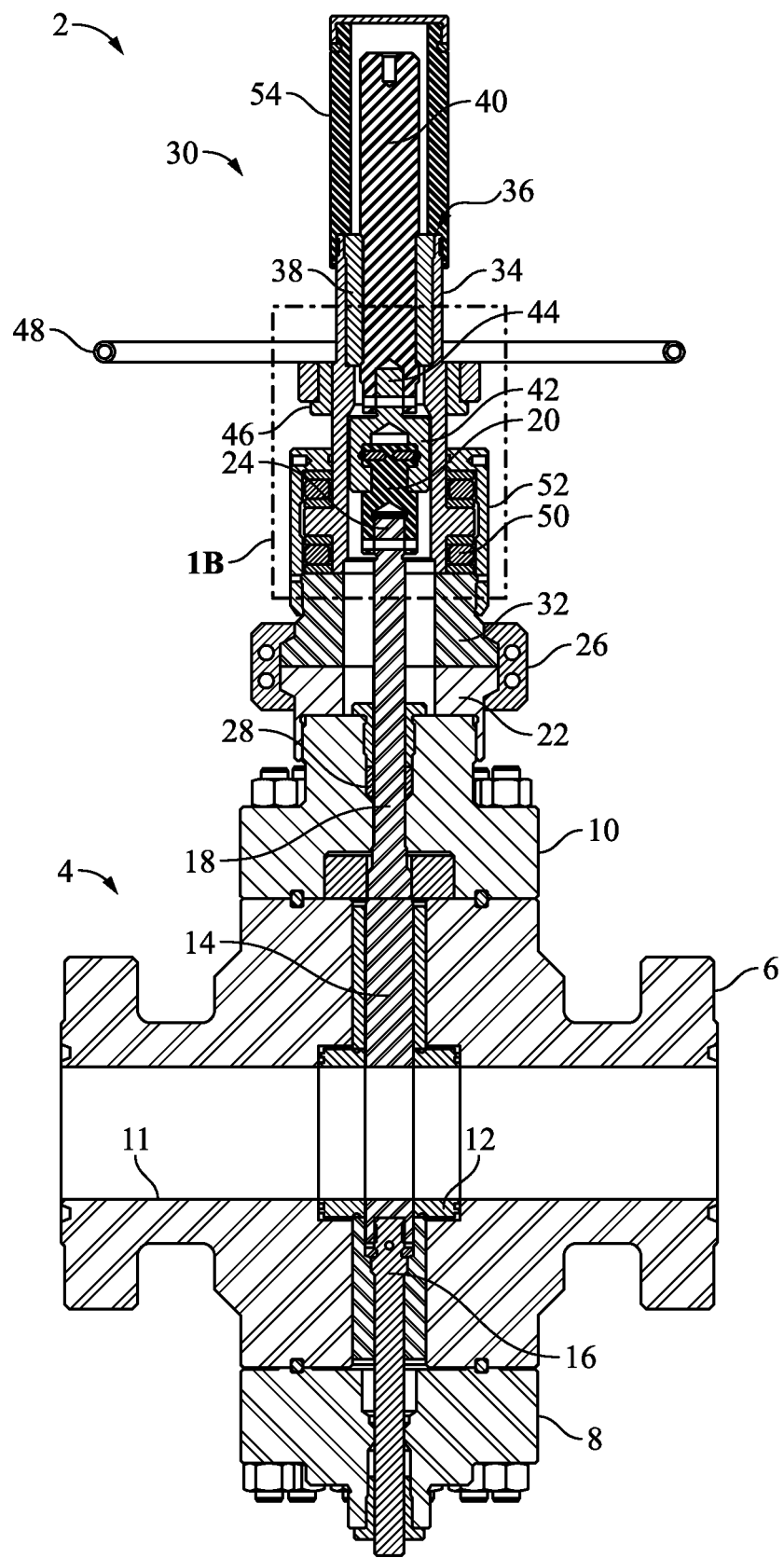
FIG. 1A is a schematic cross sectional view of an embodiment of a modular linear actuated valve with lower body module and an interchangeable upper mechanical linear actuator module, according to the invention.

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms "top", "up", "upward", "bottom", "down", "downwardly", and like directional terms are used to indicate the direction relative to the figures and their illustrated orientation and are not absolute relative to a fixed datum such as the earth in commercial use. The term "inner," "inward," "internal" or like terms refers to a direction facing toward a center portion of an assembly or component, such as longitudinal centerline of the assembly or component, and the term "outer," "outward," "external" or like terms refers to a direction facing away from the center portion of an assembly or component. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Some elements are nominated by a device name for simplicity and would be understood to include a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. As such, the use of the term "exemplary" is the adjective form of the noun "example" and likewise refers to an illustrative structure, and not necessarily a preferred embodiment. Element numbers with suffix letters, such as "A", "B", and so forth, are to designate different elements within a group of like elements having a similar structure or function, and corresponding element numbers without the letters are to generally refer to one or more of the like elements. Any element numbers in the claims that correspond to elements disclosed in the application are illustrative and not exclusive, as several embodiments may be disclosed that use various element numbers for like elements.

The present disclosure provides a modular linear actuated valve having a lower body module that can interface with an interchangeable upper linear actuator module being at least one of a mechanical linear actuator module and a fluid linear actuator module. The invention includes a quick disconnect between the body module and any of the actuator modules. An actuator assembly on the selected actuator module can be coupled to the valve stem on the lower body module using a quick disconnect segment on the actuator module and a reciprocal quick disconnect segment on the body module. A valve can be quickly converted into a mechanical linear actuated valve or a fluid linear actuator valve, simplifying manufacturing and stocking, and providing a faster response to customer orders.

Figure 1B:
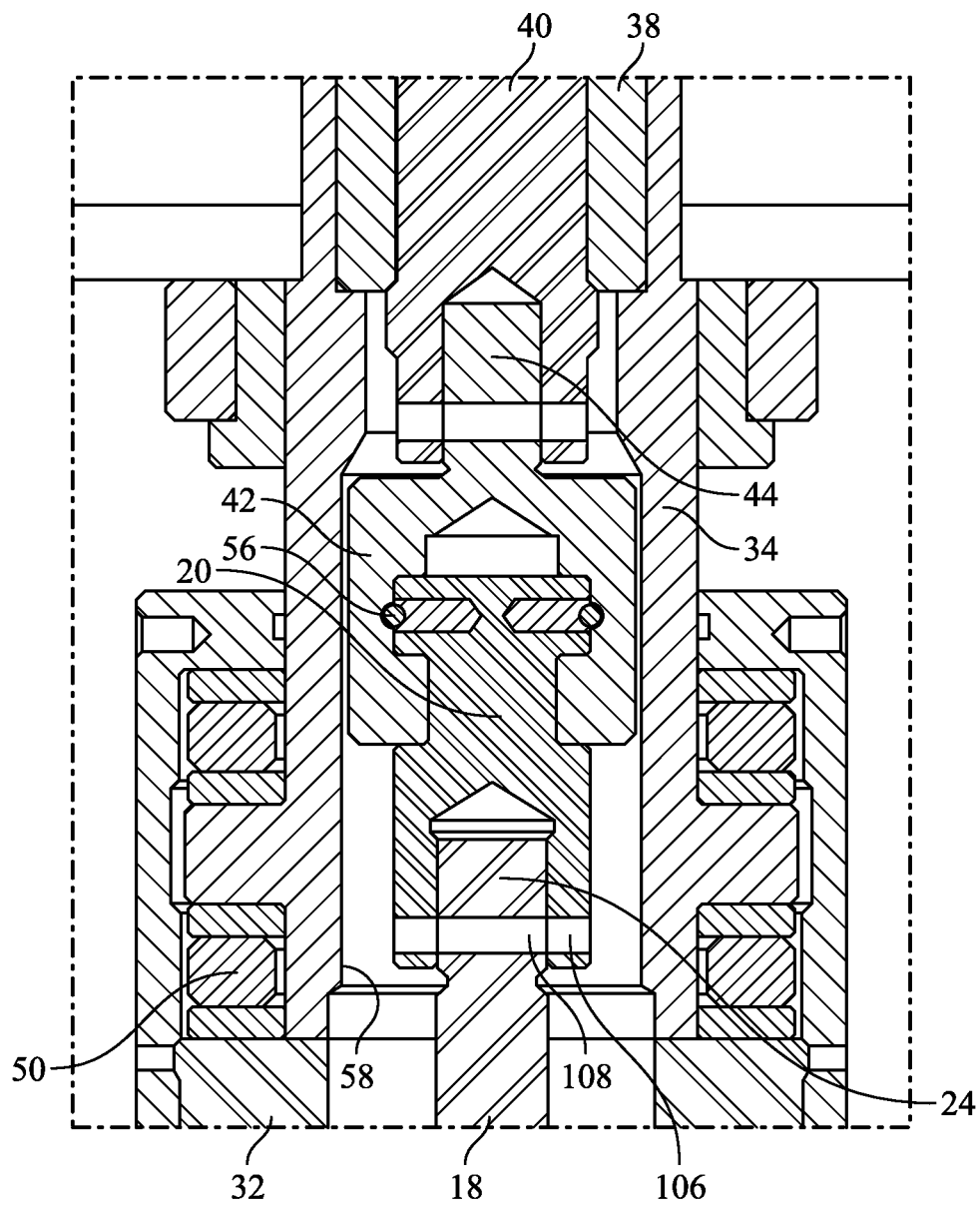
FIG. 1B is a schematic cross sectional view of an enlarged portion of FIG. 1A showing lower and upper quick disconnect segments for the body module and the mechanical linear actuator module.

FIG. 1A is a schematic cross sectional view of an embodiment of a modular linear actuated valve with lower body module and an interchangeable upper mechanical linear actuator module, according to the invention. FIG. 1B is a schematic cross sectional view of an enlarged portion of FIG. 1A showing lower and upper quick disconnect segments for the body module and the mechanical linear actuator module. The modular valve 2 includes a body module 4 that generally includes lower portions of a valve, herein illustrated as a gate valve, and an actuator module, such as a mechanical linear actuator module 30. For explanation of the principles taught herein, a gate valve is described. However, the principles are not limited to a gate valve but can include other linear actuated valves, such as a globe valve, plug valve, and others. Further, the mechanical linear actuator module is a nonlimiting example and other mechanical linear actuator modules are contemplated.

The body module 4 includes a body 6 with a lower bonnet 8 attached to a lower portion of the body and an upper bonnet 10 attached to an upper portion of the body. Internal to the body is a valve bore 11 for fluid flow therethrough in which a seat body 12 can be coupled. The seat body 12 receives a gate 14 that lowers and raises relative to the valve bore to open and close the valve. A balance stem 16 is disposed below the bore 11. The balance stem 16 extends through a bore in the body 6 and a corresponding bore in the lower bonnet 8 and a seal thereto. An upper stem 18, located distally from the balance stem relative to the valve bore, is coupled to the gate 14. The stem 18 extends through a bore in the upper bonnet 10 with an upper stem seal 28 toward the mechanical linear actuator module 30. An upward end of the upper stem 18 can be coupled with a lower quick disconnect segment 20 through a coupling 24, such as a member having threads to engage corresponding threads on the lower quick disconnect segment 20. In at least one embodiment, the lower quick disconnect segment 20 can extend upward toward the mechanical linear actuator module 30 for coupling to components as described below.

For coupling the body module 4 with the mechanical linear actuator module 30, the body module can also include a lower mounting hub 22 coupled to the upper bonnet 10. Correspondingly, the mechanical linear actuator module 30 can include an upper mounting hub 32 coupled to remaining portions of the actuator module 30. The lower and upper mounting hubs are shaped with radially extending flanges that can be received by longitudinally and radially surrounding surfaces of a mounting clamp 26 as shown. The mounting clamp 26, as removable coupling element, can be a segmented clamp, such as in two pieces, that can be secured together around the flanged surfaces of the upper and lower mounting hubs and secured in position to couple the two modules 4 and 30 together. Thus, the upper and lower mounting hubs and clamp function as a module quick disconnect assembly for the two modules.

The mechanical linear actuator module 30 further includes an actuator adapter 34 that can be longitudinally coupled to the upper mounting hub 32 but radially decoupled to allow the actuator adapter 34 to rotate relative to the stationary upper mounting hub 32 that is coupled to the lower mounting hub 22. Thrust bearings 50 can facilitate the relative rotation by supporting the actuator adapter above the upper mounting hub 32. A bearing cap 54 mounted to the upper mounting hub 32 and around the bearings 50 can maintain the relative positions between the actuator adapter 34 and the upper mounting hub. An actuator assembly 36 can be coupled to the actuator adapter 34 and can include an actuator nut 38 having internal threads to receive an actuator shaft 40. A hand wheel adapter 46 can be coupled to the actuator adapter 34, and a hand wheel 48 can be coupled to the hand wheel adapter. The hand wheel can be rotated, causing the actuator adapter 34 and actuator nut 38 to rotate. An actuator protector 54 can be coupled to the actuator adapter with sufficient length to accommodate the actuator shaft travel.

The actuator adapter 34 can include a bore 58 configured to receive an upper quick disconnect segment 42. The upper quick disconnect segment 42 can be threadably coupled with a coupling portion 44 into the actuator shaft 40. The coupling allows the upper quick disconnect segment 42 to move in conjunction with longitudinal movement of the actuator shaft 40. A lower end of the upper quick disconnect segment 42 is configured to receive the lower quick disconnect segment 20. The coupling of the two quick disconnect segments forms an actuator quick disconnect assembly. The coupling between the quick disconnect segments in the illustrated embodiment is described below in reference to the FIGS. 6A-6B and 7A-7C.

The threaded engagement between the actuator nut 38 and the actuator shaft 40 causes the actuator shaft 40 to translate longitudinally upward and downward relative to the actuator nut 38, thereby moving the quick disconnect segments 42 and 20, stem 18, and gate 14.

Figure 2A:
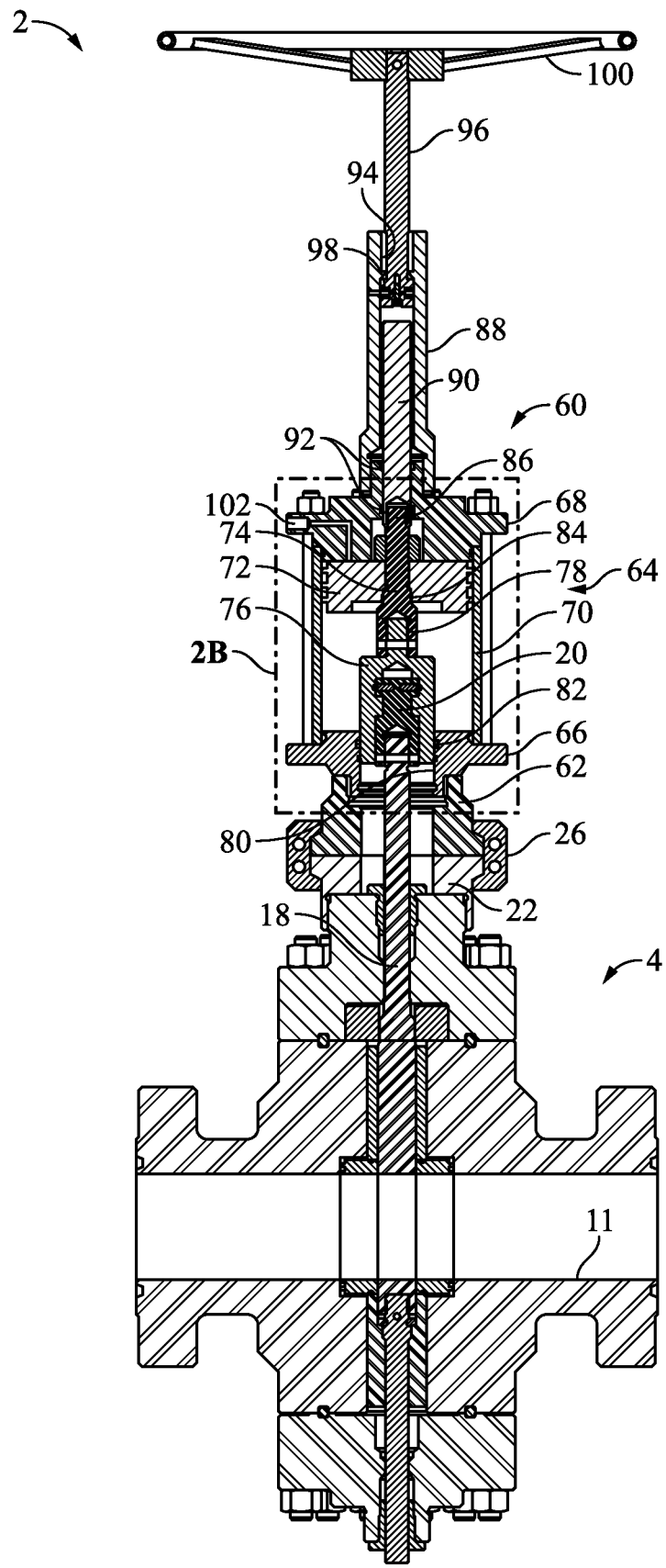
FIG. 2A is a schematic cross sectional view of an embodiment of a modular linear actuated valve with lower body module and an interchangeable upper hydraulic actuator module, according to the invention.
Figure 2B:
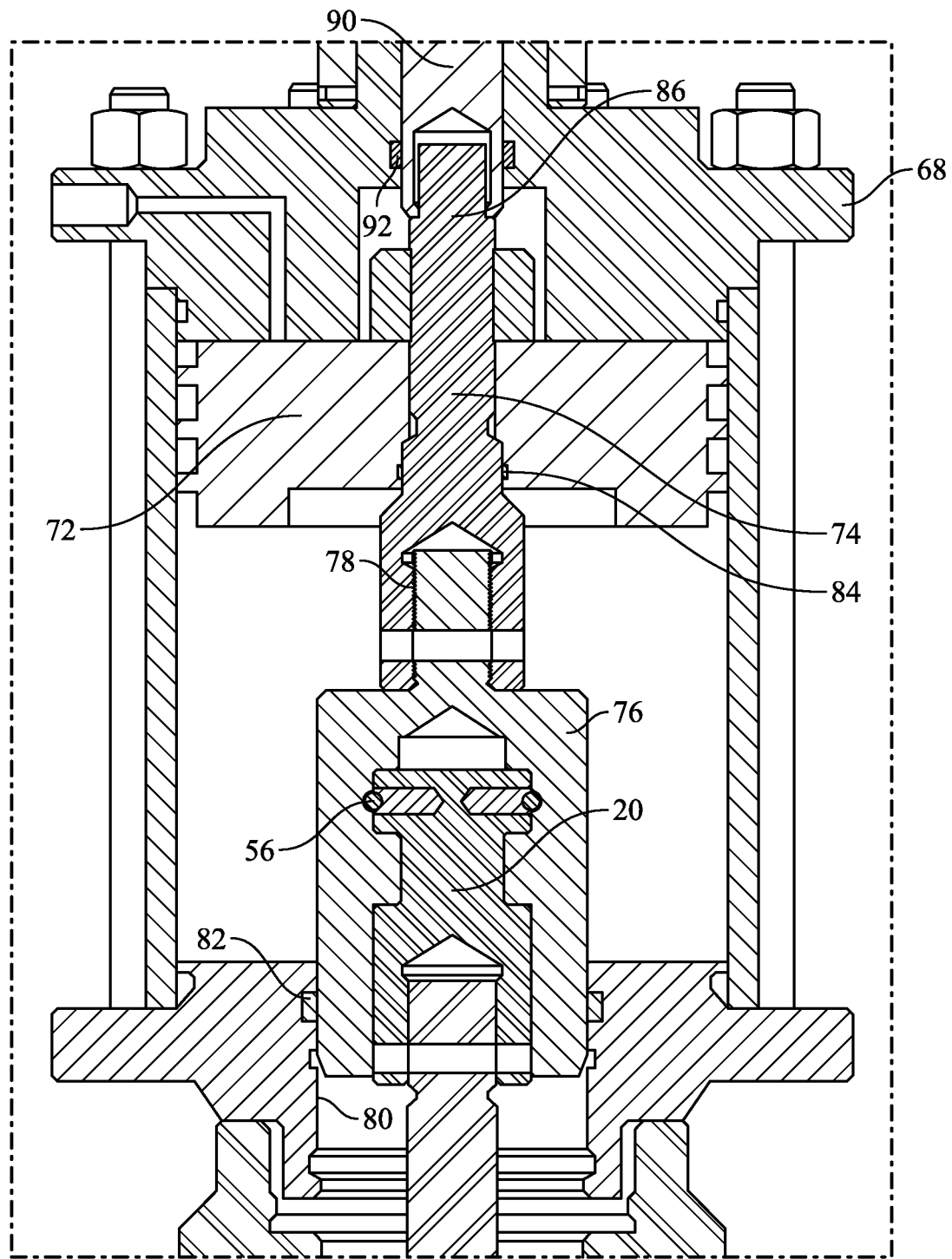
FIG. 2B is a schematic cross sectional view of an enlarged portion of FIG. 2A lower and upper quick disconnect segments for the body module and the hydraulic actuator module.

FIG. 2A is a schematic cross sectional view of another embodiment of a modular valve with lower body module and an interchangeable upper fluid linear actuator module, according to the invention. FIG. 2B is a schematic cross sectional view of an enlarged portion of FIG. 2A that show lower and upper quick disconnect segments for the body module and the fluid linear actuator module. The fluid can be a liquid such as a hydraulic fluid, or a gas such as a pneumatic fluid. Because a hydraulic system is often used commercially, the below description will described a hydraulic actuator module with the understanding that other fluid linear actuator modules are possible, including pneumatic actuator modules.

This embodiment of the modular valve 2 includes the same body module 4, but a different upper module for actuating the valve. A fluid linear actuator module 60, such as a hydraulic actuator module embodiment, with an upper mounting hub 62 is designed to be coupled to the same lower mounting hub 22 on the body module 4 and mounting clamp 26 as described above. A double-acting hydraulic cylinder 66 can be coupled to the upper mounting hub 62. A manual override assembly 88 can be coupled to the hydraulic cylinder 64. A hand wheel 100 can be coupled to the manual override assembly.

The hydraulic cylinder 64 can be coupled to the upper mounting hub 62. The hydraulic cylinder 64 can include a lower end cap 66, hydraulic barrel 70 coupled to the lower end cap 66, and upper end cap 68 coupled to the hydraulic barrel 70. A piston 72 is slidably engage with an internal diameter of the hydraulic barrel forming the bore of the hydraulic cylinder. A longitudinal opening through the piston 72 allows the sealed insertion of a middle stem 74 in a longitudinal direction. The middle stem 74 can be sealingly coupled through the piston 72 with a seal 84. An upper end of the middle stem 74 can be coupled to a manual override assembly 88 described below. An upper quick disconnect segment 76 can be coupled to a lower end of the middle stem 74, for example, by a threaded coupling 78 to threadably engaged a corresponding threads in the lower end of the middle stem. The middle stem 74 and upper and lower quick disconnect segments function as a piston rod for the hydraulic cylinder 64 to actuate the valve open and closed. A fluid port 102 in the upper end cap 68 provides a flow path for hydraulic fluid for the hydraulic cylinder 64 to pressurize an upper portion of the cylinder to force the piston 72 downward and close the valve. While not shown in the illustrated cross section at that particular orientation, another fluid port can be provided through the lower end cap 66 for fluid for the hydraulic cylinder 64 to pressurize a lower portion of the cylinder to force the piston 72 upward and open the valve. With the bidirectional piston movement, the double-acting hydraulic cylinder can close and open the linear actuated valve 2.

A manual override assembly 88 can optionally be coupled to the middle stem 74 upper end. The manual override assembly 88 includes a manual override shaft 90 slidably engaged therein. One or more seals 92 can seal the manual override shaft with pressures from the hydraulic cylinder 64. The middle stem 74 can be coupled with a coupling 86 to the manual override shaft 90 that may be formed from a threaded engagement of the components. The manual override assembly 88 further includes an actuator nut 94 that can threadably engage an actuator shaft 96 passing therethrough. A hand wheel 100 can be coupled to the actuator shaft 96 to turn the actuator shaft 96 relative to the actuator nut 94 and lower and raise the actuator shaft. If the valve fails open, the manual override assembly 88 can be used to close the valve.

Figure 3:
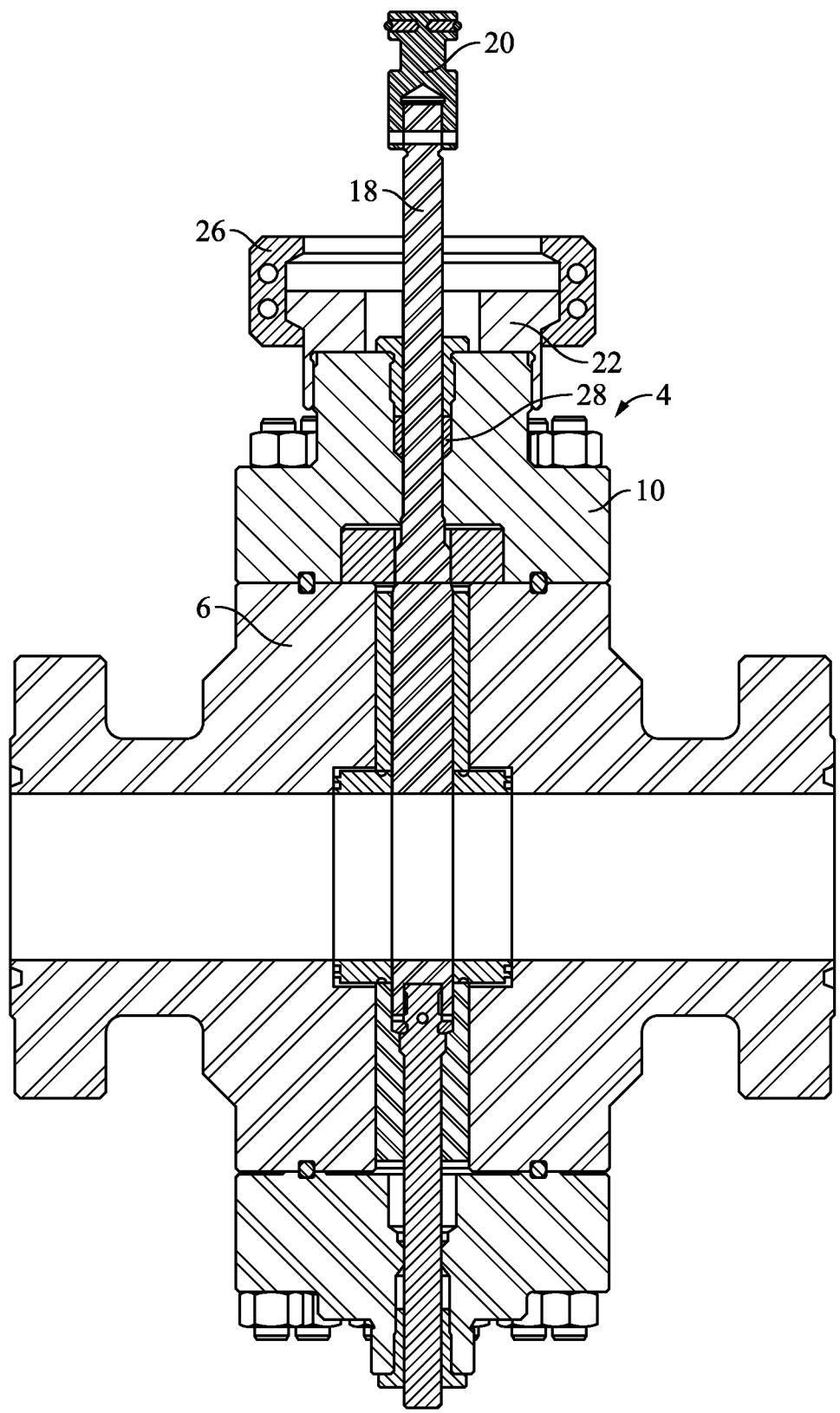
FIG. 3 is a schematic cross sectional view of the body module of the valve with a lower mounting hub and mounting clamp without the interchangeable actuator modules.

FIG. 3 is a schematic cross sectional view of the body module of the valve with a lower mounting hub and mounting clamp without the interchangeable actuator modules. The body module 4 of the valve 2 can coupled to either to the actuator modules. The key components for connecting is a universal transition to connect the modules such as in the upper and lower mounting hubs with the mounting clamp and to connect the actuator function, such as through the upper and lower quick disconnect segments. With those few components, the actuator modules can become interchangeable. In at least one embodiment, the body module 4 could be preassembled with the upper bonnet 10 having the upper stem seal and upper stem 18 assembled with the lower quick disconnect segment 20. The lower mounting hub 22 can be coupled to the bonnet 10 with the mounting clamp 26 coupled to the lower mounting hub. Then depending on the customer order, the mechanical linear actuator module 30 or the fluid linear actuator module 60 can be quickly assembled to the body module 4 and its preassembled components.

Figure 4A:
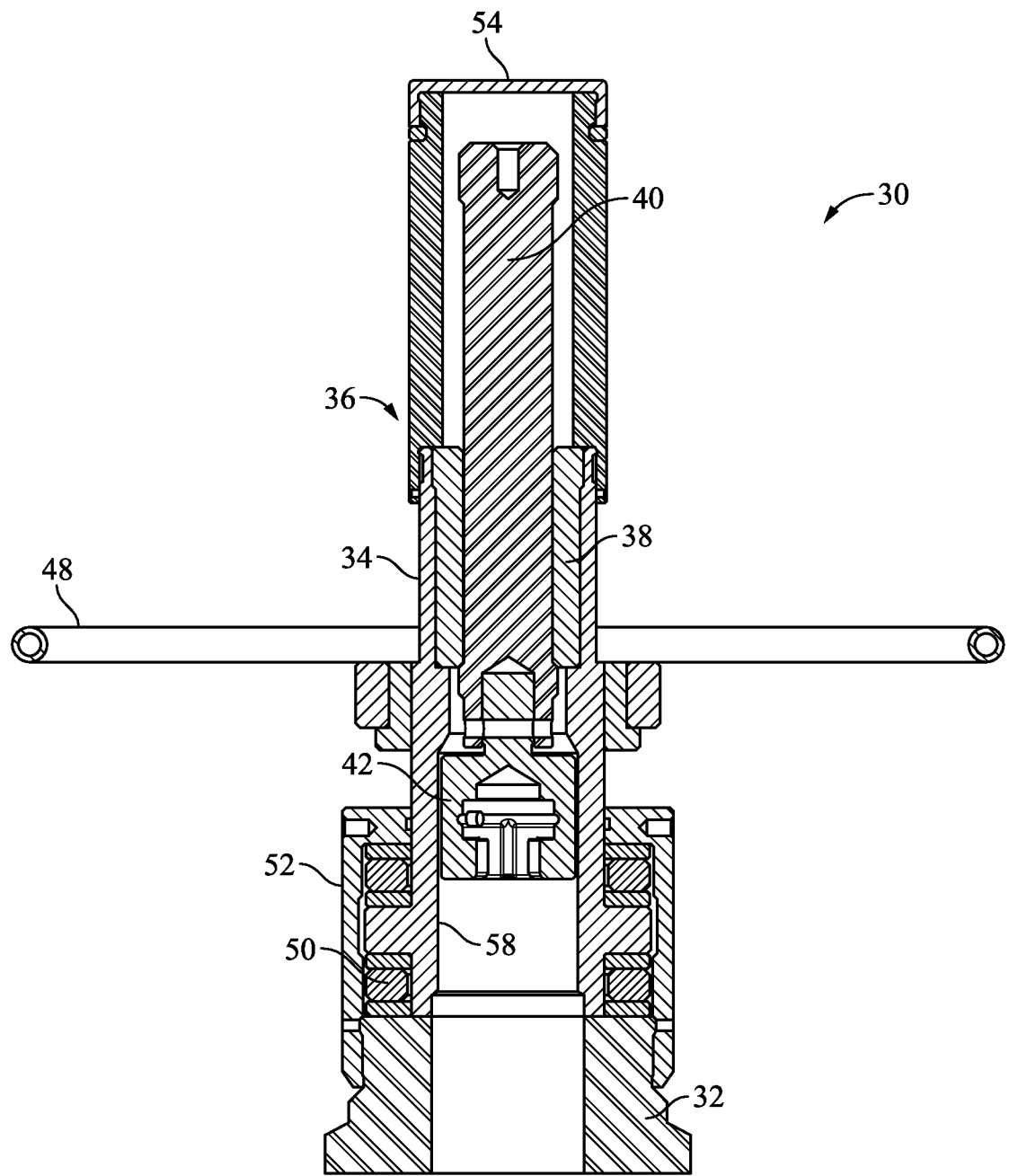
FIG. 4A is a schematic cross sectional view of an interchangeable mechanical linear actuator module in a retracted (upward) position for an open valve with an upper mounting hub and an upper quick disconnect segment.

FIG. 4A is a schematic cross sectional view of an interchangeable mechanical linear actuator module in a retracted (upward) position for an open valve with an upper mounting hub and upper quick disconnect segment. The mechanical linear actuator module 30, as described above, can be readily attached to the body module 4. The mechanical linear actuator module can include the bearing cap 52 that is coupled with the upper mounting hub 32 to hold the actuator adapter 34 to the mounting hub in conjunction with the thrust bearings 50. The hand wheel 48 is coupled to the actuator adapter 34 and can rotate the actuator adapter with the components therein supported by the bearings 50. As the hand wheel rotates the bearing adapter 34, the actuator nut 38 by threaded engagement with the actuator shaft 40 raises and lowers the actuator shaft, extending up into the actuator protector 54. The upper quick disconnect segment 42 is consequently raised and lowered in conjunction with the actuator shaft in the bore 58 of the actuator adapter 34 and the corresponding bore of the upper mounting hub 32. In the retracted position shown, the actuator shaft 40 could be used to raise the gate described above and open the valve, when the actuator module 30 is coupled with the body module 4.

Figure 4B:
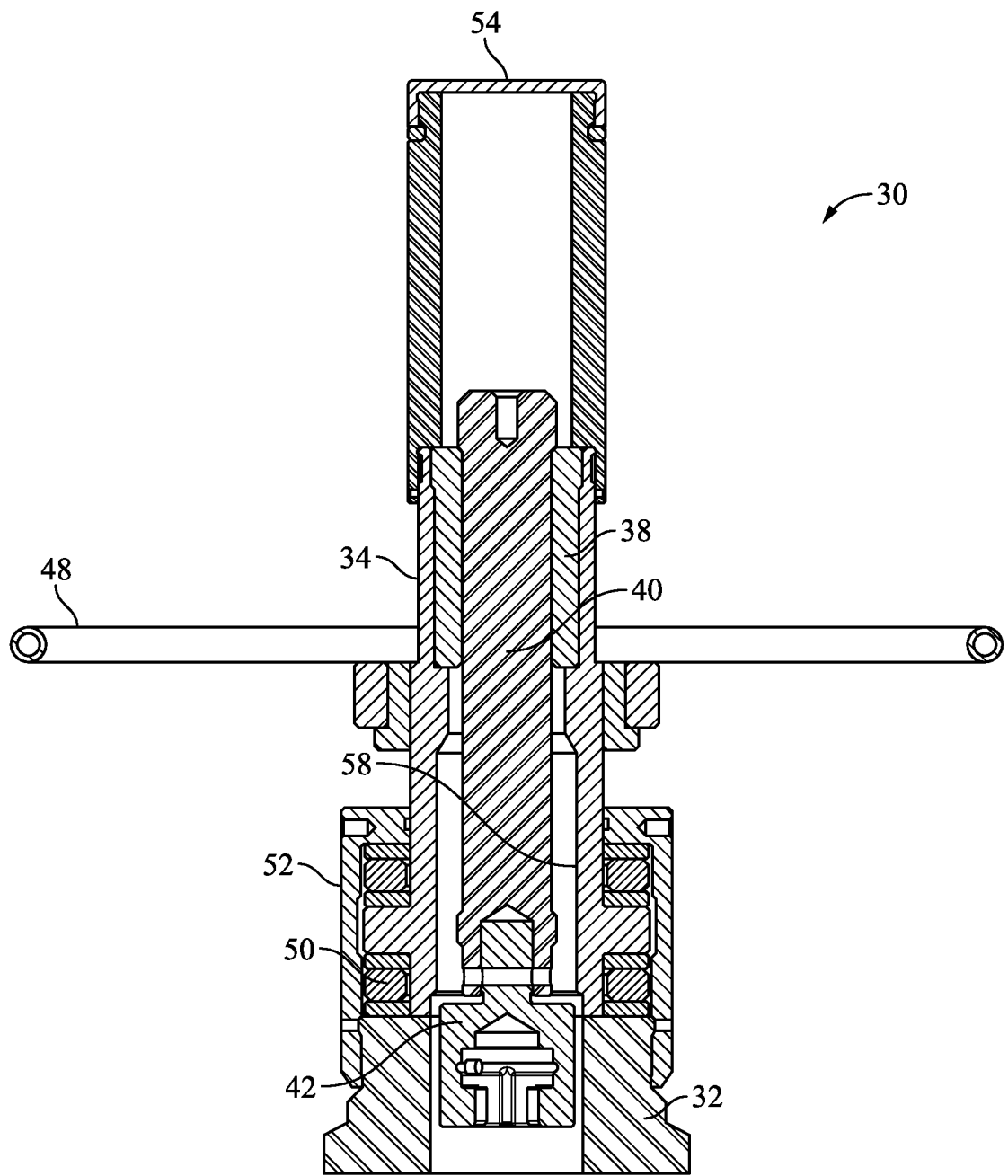
FIG. 4B is a schematic cross sectional view of the interchangeable mechanical linear actuator module of FIG. 4A in an extended (downward) position for a closed valve.

FIG. 4B is a schematic cross sectional view of the interchangeable mechanical linear actuator module of FIG. 4A in an extended (downward) position for a closed valve. In the position shown, the actuator shaft 40 is shown in an extended position that in the illustrated embodiment allows the upper quick disconnect segment 42 to extend into the bore of the upper mounting hub 32. An extended position may facilitate coupling with the lower quick disconnect segment 20 that extends upwardly from the body module 4 described above.

Figure 5A:
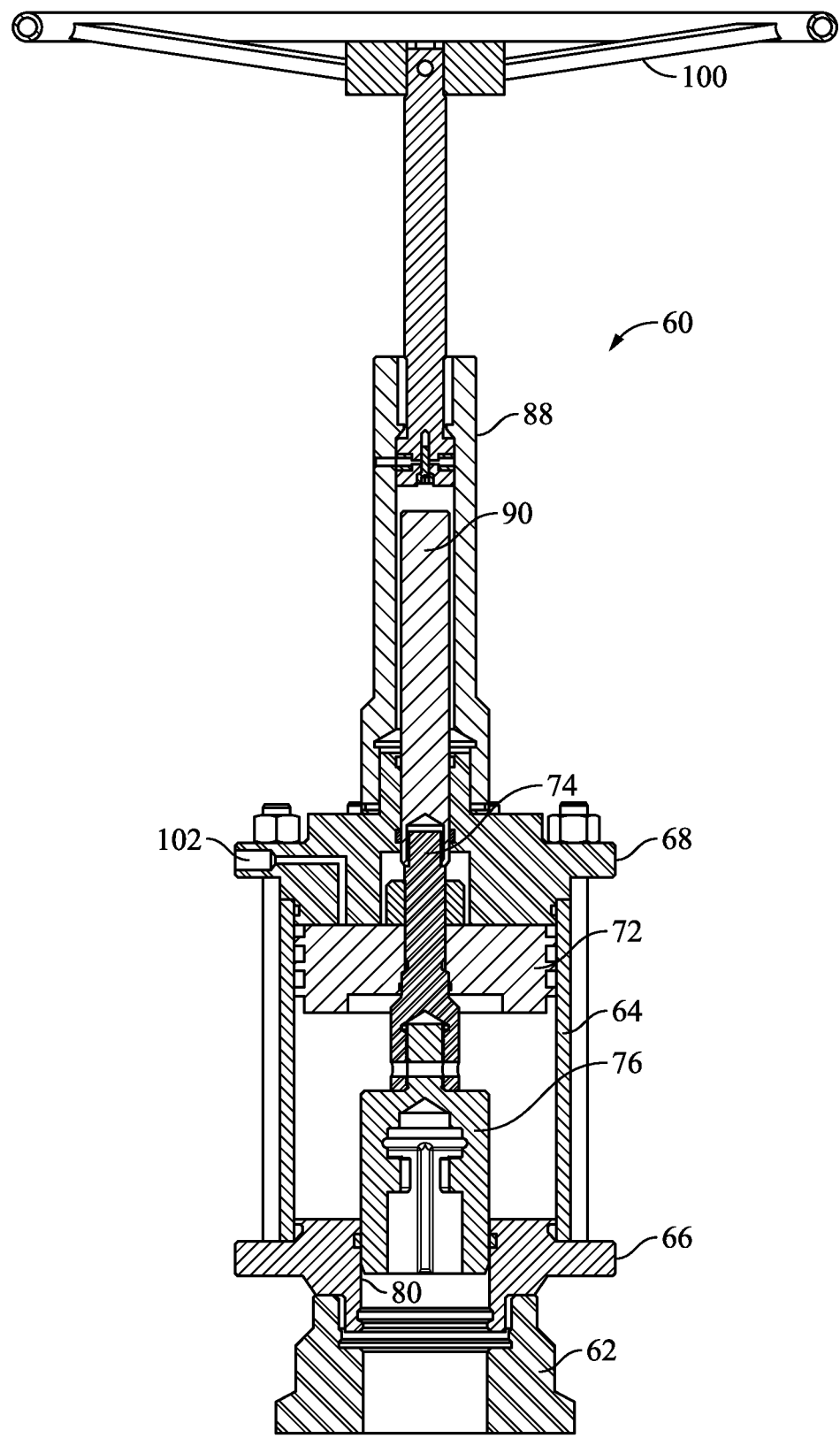
FIG. 5A is a schematic cross sectional view of an interchangeable hydraulic actuator module in a retracted position for an open valve with an upper mounting hub and an upper quick disconnect segment.

FIG. 5A is a schematic cross sectional view of an interchangeable hydraulic actuator module in a retracted position for an open valve with an upper mounting hub and an upper quick disconnect segment. In the retracted position, the piston 72 can raise as far as the upper end cap 68. As the piston retracts and extends, the middle stem 74 coupled to the piston and the manual override shaft 90 coupled to the middle stem are consequently raised and lowered. The middle stem 74 also raises the coupled upper quick disconnect segment 76. In this embodiment, the upper quick disconnect segment 76 is longer than the corresponding upper quick disconnect segment 42 described above in reference to FIG. 1A. The additional length allows the upper quick disconnect segment 76 to sealingly and slidably engage the bore 80 through the lower end cap 66 and seal the hydraulic cylinder chamber for pressurized operation. Other actuator modules are contemplated, including pneumatic actuators, stepper motor actuators, and other powered actuators that can interface with the body module 4 of the valve.

Figure 5B:
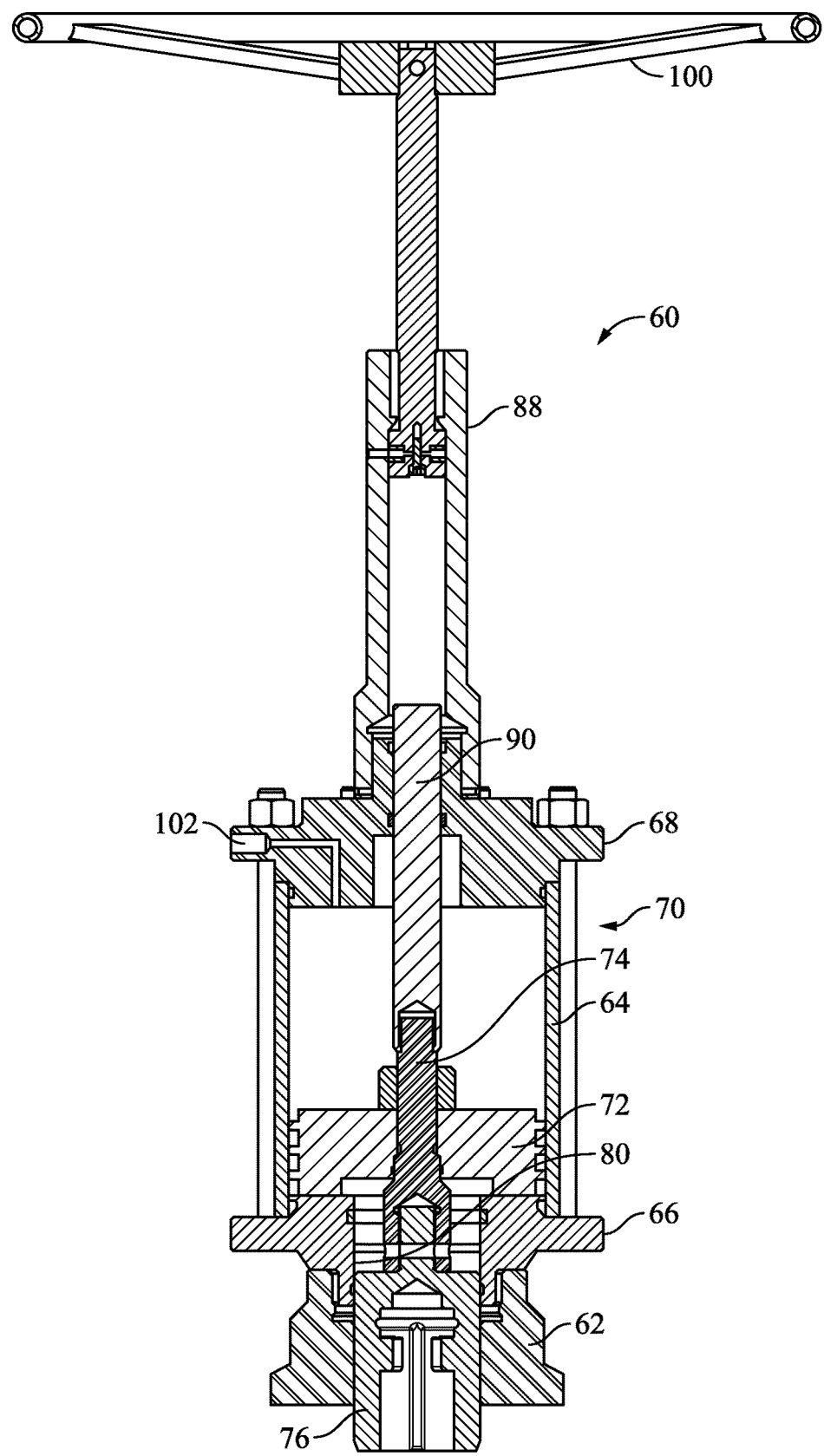
FIG. 5B is a schematic cross sectional view of the interchangeable hydraulic actuator of FIG. 5A in an extended position for a closed valve.

FIG. 5B is a schematic cross sectional view of the interchangeable hydraulic actuator module of FIG. 5A in an extended position for a closed valve. The hydraulic actuator module can be powered through the fluid port 102 to lower the piston 72 or through a corresponding port fluidicly coupled to the hydraulic cylinder on a distal side of the piston to raise the piston. In operation, the fluid port 102 allows pressurized fluid to enter into the upper portion of the double-acting hydraulic cylinder 64 and force the piston to move downward in the cylinder to an extended position as shown. Conversely, pressurized fluid can enter into a corresponding port below the piston and force the piston to move upward in the cylinder to a retracted position. The length of the upper quick disconnect segment 76 can still allow sealing engagement with seals in the bore 80 of the lower end cap 66. Also, this position may facilitate engagement with the lower quick disconnect segment 20 of the body module 4.

Figure 6A:
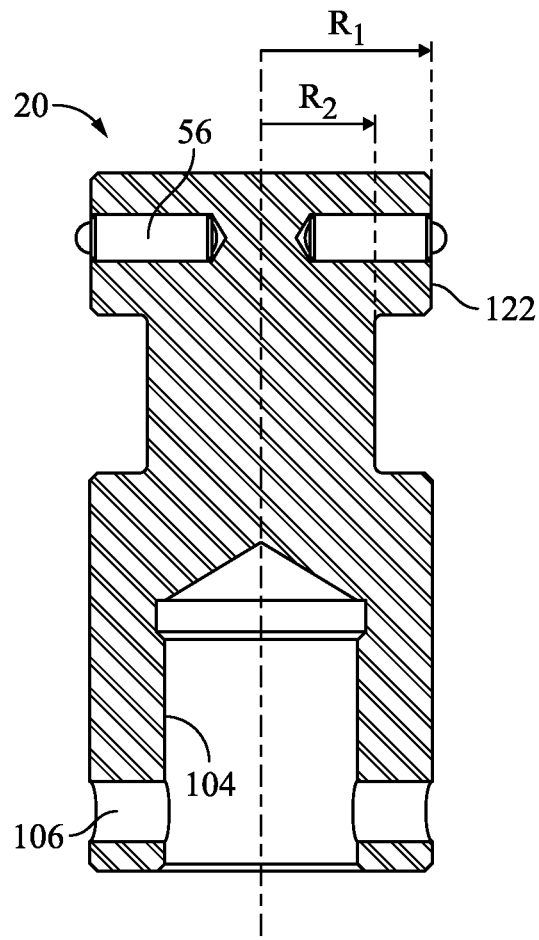
FIG. 6A is a schematic cross sectional view of an embodiment of an upper quick disconnect segment of an interchangeable actuator module.
Figure 6B:
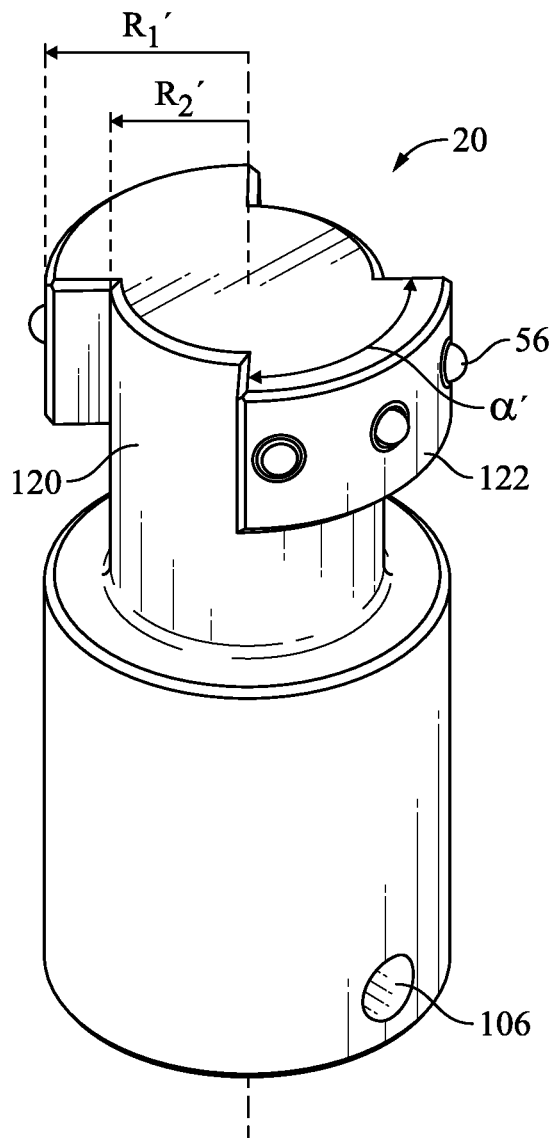
FIG. 6B is a schematic bottom view of the upper quick disconnect segment of FIG. 6A.

FIG. 6A is a cross-sectional view of an embodiment of a lower quick disconnect segment for the stem of the body module. FIG. 6B is a schematic perspective view of the lower quick disconnect segment of FIG. 6A. The lower quick disconnect segment 20 includes a lower portion with a bore 104 than can be threaded to engage a threaded upper end of the upper stem 18, as shown in FIG. 1B. An anti-rotation opening 106 can align with a corresponding opening in the upper stem to allow a pin to be inserted to prevent the coupling from undesirably rotating and becoming disconnected.

An upper portion of the lower quick disconnect segment 20 is configured as an insert portion 120 to insert into a corresponding receiver portion of the upper quick disconnect segment 42 or 76 on their respective actuator modules to engage and disengage with the upper quick disconnect segment. As a nonlimiting example, the quick connect function can be designed with the insert portion 120 having a first diameter R1' and extending outward with one or more protrusions 122 (also known as sectors) having a larger radius of R2' and an angular width of angle α'. The radii and angle can be somewhat smaller than corresponding radii and angle of the receiver portion to allow clearance for insertion into the receiver portion. The protrusions 122 can include interface couplings 56. In at least one embodiment, the interface couplings 56 can be in the form of a radially outwardly-biased ball plunger. The ball plunger can be depressed radially inwardly to an effective smaller radius during insertion and released to extend into a grooved opening with a larger radius. The number of interface couplings 56 can vary depending on the design and load.

Figure 7A:
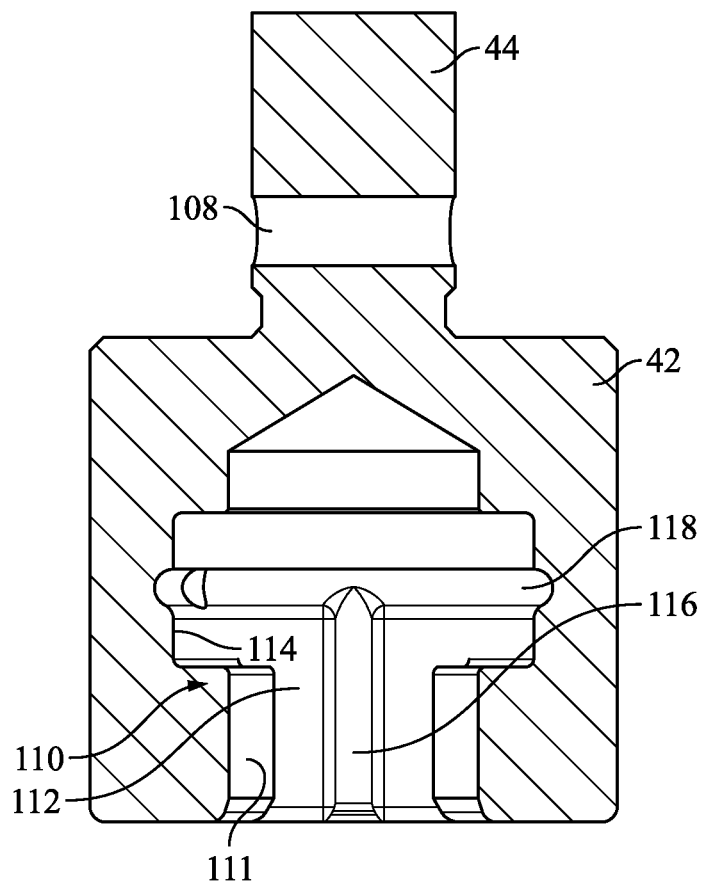
FIG. 7A is a cross-sectional view of an embodiment of a lower quick disconnect segment for the stem of the body module.
Figure 7B:
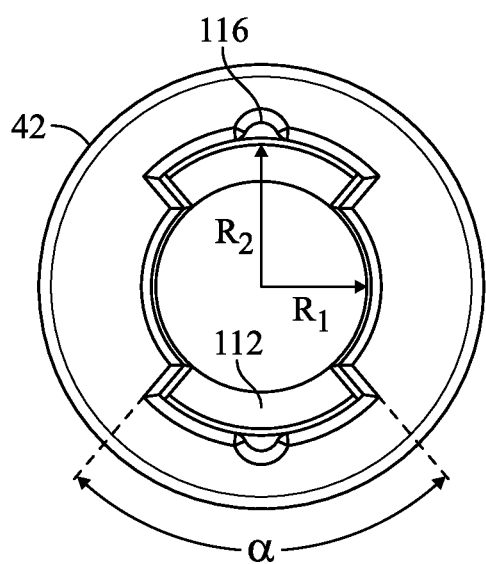
FIG. 7B is a schematic perspective view of the lower quick disconnect segment of FIG. 7A.
Figure 7C:
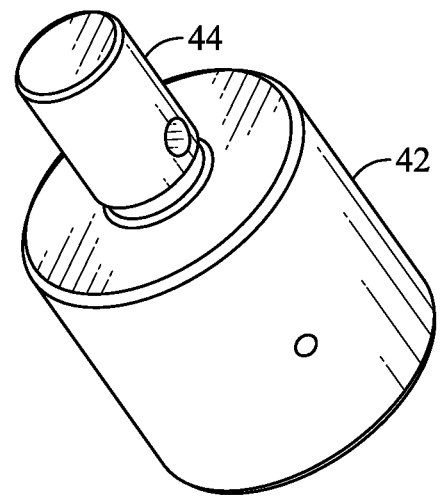
FIG. 7C is a schematic perspective view of the upper quick disconnect segment of FIG. 7A.

FIG. 7A is a schematic cross sectional view of an embodiment of an upper quick disconnect segment of an interchangeable actuator module. FIG. 7B is a schematic bottom view of the upper quick disconnect segment of FIG. 7A. FIG. 7C is a schematic perspective view of the upper quick disconnect segment of FIG. 7A. The upper quick disconnect segment 42 includes a coupling portion 44 that can be threaded to engage a threaded portion of the actuator shaft 40 described above and shown for example in FIG. 1B. Other couplings are envisioned and the embodiment is only illustrative. An anti-rotation opening 108 can correspond to a similar opening in the actuator shaft 40 to receive a pin to prevent the decoupling of the upper quick disconnect segment with the actuator shaft.

The upper quick disconnect segment 42 further includes a receiver portion 110 to receive the insert portion 120 of the lower quick disconnect segment 20. In at least embodiment, the receiver portion 110 can be in the form of an L-slot shaped opening having a first bore 111 with a radius R1 and an intersecting bore 114 having a radius R2 larger than the first bore radius R1 and forming a shoulder between the bore 111 and bore 114. The receiver portion 110 can further include one or more longitudinal side slots 112 having a radius R2 and angular width of angle α. A longitudinal groove 116 can be formed in one or more of the slide slots 112. The longitudinal groove 116 can be located to receive an interface coupling 56, such as the illustrated ball plunger, from the protrusion 122 in the lower quick disconnect segment 20 of FIGS. 6A and 6B. The alignment of the interface coupling 56 with the longitudinal groove 116 forms a self-aligning feature to facilitate coupling of the quick disconnect segments 20 and 42. The intersecting bore 114 can further have a circumferential groove 118 to receive the interface couplings 56 when the insert portion 120 of FIGS. 6A and 6B is inserted sufficiently into the receiver portion 110. The insert portion 120 can be rotated in the receiver portion 110 when the protrusions 122 are longitudinally positioned in the bore 114 and out of alignment with the side slots 112 so that the protrusions remain in the bore 114 for operating the valve. The protrusions can be rotated until an angular stop is encountered in the bore 114.

A receiver portion 110 can be formed in like design in the upper quick disconnect segment 76 of the hydraulic actuator module 60 that can interface with the same lower quick disconnect segment 20 of the body module 4.

To release the actuator module 30 or 60 from the body module 4, the mounting clamp 26 described above can be removed to allow the mounting hubs 22 and 32 to be decoupled. The actuator shaft in the actuator module 30 or 60 can be extended toward the body module 4, which can push the actuator module away from the body module. The receiver portion 110 of the upper quick disconnect segment 42 or 76 can be rotated relative to the insert portion 120 of the lower quick disconnect segment 20 until the protrusions 122 are again aligned with the side slots 112. The upper quick disconnect segment 42 or 76 and the lower quick disconnect segment 20 can be decoupled and the body module 4 and actuator module 30 or 60 can be separated completely.

Other and further embodiments utilizing one or more aspects of the inventions described above can be devised without departing from the disclosed invention as defined in the claims. For example, the general principals apply for operation of a linear actuated valve. Thus, a globe valve would also benefit from the invention and is included with the scope of the claims. Further, some of the components could be arranged in different locations in the valve, and other variations that are limited only by the scope of the claims.

The invention has been described in the context of preferred and other embodiments, and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope of the following claims.

What is claimed is:

1. A modular linear actuated valve, comprising:
    a body module comprising:
        a valve body with at least one body bore formed in the body to allow fluid to flow therethrough;
        a sealing element configured to selectively seal across the body bore;
        a valve stem coupled to the sealing element, the valve stem configured to move linearly in a direction to open and close the sealing element across the body bore; and
        a first quick disconnect segment coupled on a portion of the valve stem distal from the sealing element;
    a linear actuator module configured to be coupled to the body module and comprising:
        a linear actuator configured to move linearly relative to the valve stem in the body module; and
        a second quick disconnect segment configured to be coupled to the linear actuator and to be coupled to the first quick disconnect segment; and
    a module quick disconnect assembly configured to removably couple the body module with the linear actuator module.

2. The modular linear actuated valve of claim 1, comprising a valve having a body module being configured to interchangeably couple with a mechanical linear actuator module and a fluid linear actuator module.

3. The modular linear actuated valve of claim 1, comprising a gate valve having a body module being configured to interchangeably couple with a mechanical linear actuator module and a fluid linear actuator module.

4. The modular linear actuated valve of claim 2, wherein the mechanical linear actuator module and a fluid linear actuator module each comprise a second quick disconnect segment configured to couple with the same first quick disconnect segment on the body module.

5. The modular linear actuated valve of claim 1, wherein one of the quick disconnect segments is configured to be inserted into the other quick disconnect segment and rotated to be secured into position and after secured for the linear actuator to linearly move in a first direction for a valve opening and move in a second direction for a valve closure.

6. The modular linear actuated valve of claim 1, wherein the body module is configured to be coupled to linear actuator modules with different types of actuators when coupled with the removable coupling element and the quick disconnect segments are coupled.

7. The modular linear actuated valve of claim 1, wherein the module quick disconnect assembly comprises a first mounting hub coupled to the body module, a second mounting hub coupled to the actuator module, and a mounting clamp configured to clamp the hubs together.

* * * * *